April 14, 1970 R. W. BROCKSCHMIDT ET AL 3,506,789

AUTOMATIC GROUND START CIRCUIT FOR PRIVATE BRANCH EXCHANGES

Filed July 25, 1967

INVENTORS
R. W. BROCKSCHMIDT
R. W. HUTTON, SR.
BY [signature]
ATTORNEY

United States Patent Office 3,506,789
Patented Apr. 14, 1970

3,506,789

AUTOMATIC GROUND START CIRCUIT FOR PRIVATE BRANCH EXCHANGES

Richard W. Brockschmidt, Downers Grove, and Robert W. Hutton, Sr., Oak Lawn, Ill., assignors to Western Electric Company, Incorporated, New York, N.Y., a corporation of New York Filed July 25, 1967, Ser. No. 655,854
Int. Cl. H04m 7/00
U.S. Cl. 179—18 10 Claims

ABSTRACT OF THE DISCLOSURE

An automatic ground start circuit for use at PBX stations equipped for automatic cut-through to a central office in the event of a power failure at the PBX includes a relay for controlling connection of the start ground to the line. The relay is connected to the line at the station and the point of connection coincides with the electrical midpoint between the two sides of the line so that the relay will not be sensitive to supervisory potential reversals on the tip and ring.

BACKGROUND OF THE INVENTION

Our invention relates to an automatic ground start circuit and more particularly to an automatic ground start circuit for use at a telephone private branch exchange installation.

It is common practice to provide at many telephone exchanges an auxiliary or standby power source which may be activated in the event of a failure of the normal power source such as may result, for example, from a malfunction of the public power distribution network which is serving the exchange area. With such auxiliary facilities the exchange may continue ot function during so-called power failures and, indeed, this ability has proven to be invaluable on many occasions. Considerable expense is obviously involved in the duplication of equipment required for provision of the service and for this reason primarily it is not usually feasible to provide such auxiliary equipment in smaller installations, for example in a private branch exchange. However, in order that at least limited service will still be available at the PBX in the event of a power failure, it is common practice to provide means at the PBX whereby, in the event of such happening, one or more predesignated stations of the PBX will be cut through directly to the central office where the auxiliary power source is available.

The means referred to just above commonly comprises in general a "power failure" relay which is normally held operated by the PBX power source and which, while so operated, closes paths for connecting the station, when it is off hook, through the normal PBX circuits and via a ground start trunk to the central office. Should the power fail, however, the relay releases, opens the path to the normal PBX circuits and the ground start trunk, and closes a path for connecting the station, when it is off hook, directly to the central office.

Since during the emergency connection just referred to the ground start trunk has been eliminated from the connection to the central office, other means must be provided for initiating the start ground to the central office. Accordingly it has been the practice to provide at the station a nonlocking key which, when closed, connects start ground to the ring of the line. Thus a customer after going off hook for initiating an emergency connection would close the ground key and hold it closed until dial tone was received from the central office after which he could then dial the call in the usual manner. However, it has been found in actual practice that the arrangement has not been entirely satisfactory since the customer often fails to operate the key at all or to hold it closed for a sufficient period of time. Such omissions on the part of the customer are more likely to occur, of course, under the periods of stress usually prevailing during power failures and similar emergency conditions.

Accordingly, it is an object of our invention to improve the operation of PBX's.

Another object of our invention is to enhance and improve emergency communicating facilities associated with a PBX.

A more specific object of our invention is the automatic transmission of a start ground from a PBX station.

SUMMARY OF THE INVENTION

In accordance with a specific embodiment of our invention an automatic ground start circuit for use at PBX stations equipped for automatic cut-through to a central office in the event of a power failure at the PBX includes a station relay having a low resistance operate winding and a high resistance hold winding. The relay is connected between one side of the station transmitter and the ring side of the line, this point of connection being the electrical midpoint between the tip and ring so that the relay is insensitive to supervisory polarity reversals on the line. In the event of a power failure and cut-through of the station to the central office, when the customer goes off hook and closes the station loop, resistance ground is connected to the ring through a break contact of the relay and transmitted to the central office in place of the start ground normally provided via the PBX circuits. The resistance ground operates the line relay at the central office and ground then connected to the tip operates the station relay through the low resistance winding. After operation of the station relay the operate winding is shunted and the relay is held operated through the high resistance winding; the transmitter talk path is completed directly via a make contact of the relay.

A feature of our invention resides in the connection of the station relay to a point in the station circuit which coincides with the electrical midpoint between the tip and ring of the line.

Another feature of our invention is a multiwinding relay operated through a low resistance winding in series with the transmitter talk path and held operated through a high resistance winding in shunt with the transmitter talk path.

BRIEF DESCRIPTION OF THE DRAWINGS

A full understanding of the arrangement contemplated by our invention as well as an appreciation of the various advantageous features thereof may be gained from consideration of the following detailed description in connection with the accompanying drawing in which.

DETAILED DESCRIPTION

Figure 1:
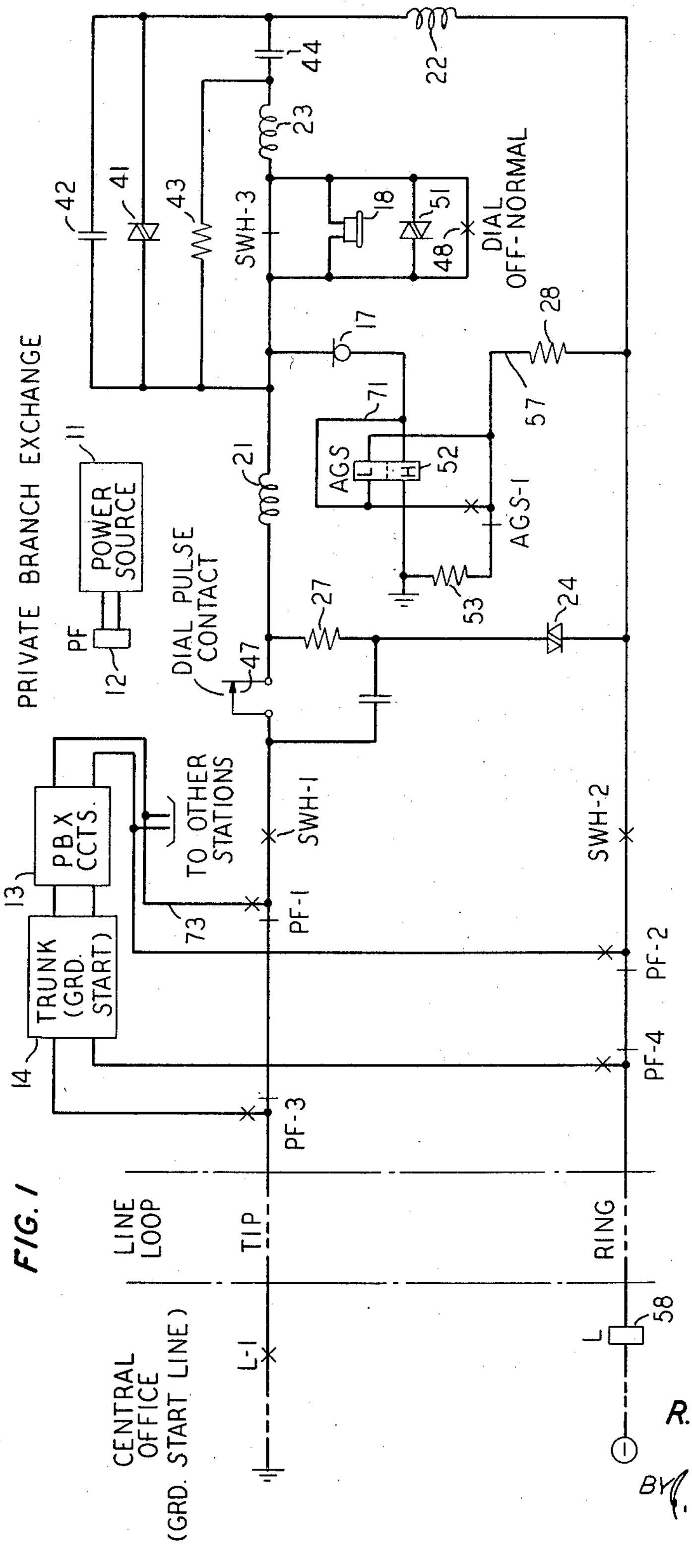
FIG. 1 shows schematically a station circuit and associated PBX ad line circuits which comprise one specific illustrative embodiment of the arrangement contemplated by our invention.

The station circuit illustrated in FIG. 1 is assumed to be one of the PBX stations predesignated for emergency service in the event the power source at the PBX, represented by captioned box 11, should fail. Additional stations of the PBX may, of course, also be so designated if required by the local conditions. "Power failure" relay 12 is normally held operated from power source 11; should the power supply fail, however, relay 12 will immediately release. Under normal power conditions with power failure relay 12 held operated, the station, when it goes off hook and closes switchhook contacts SWH–1 and SWH–2, will be connected through the make contacts of transfer pairs PF–1 and PF–2 of the power failure relay to the normal PBX circuits represented by captioned box 13, and through the ground start trunk, represented by captioned box 14, and the make contacts of transfer pairs PF–3 and PF–4 of the power failure relay back to the line for connection to the central office. In the event of a power failure at the PBX, however, relay 12 will release and the station when off hook will then be connected directly to the central office through the break contacts of the same transfer pairs; the normal PBX circuit 13 and the ground start trunk 14 will be excluded from the connection.

The basic station circuit, that is exclusive of the AGS relay, connection which will be described in detail subsequently, is generally similar to the circuit disclosed in Patent 2,629,783, issued Feb. 24, 1953 to H. F. Hopkins. The circuit is of the so-called antisidetone type and involves precise design whereby to attain and maintain exact line balance. Obviously, any modifications made in the circuit in order to incorporate the arrangement contemplated by the present invention should be such that the line balance will not be upset. The station circuit illustrated includes transmitter 17 and receiver 18 which are connected in an antisidetone circuit by the three windings 21, 22, and 23 of a multiwinding inductance coil. The three windings 21, 22, and 23 are mutually coupled and are designed to provide a conjugate relationship between transmitter 17 and receiver 18.

A current-sensitive resistance element 24, which may for example comprise a symmetrical varistor, is connected in series with resistor 27 across the line whereby to maintain the transmission level at the line end of the station circuit substantially constant regardless of the impedance of the subscriber's loop which may vary, of course, according to the length of each loop. Resistor 28 is included in the transmitter circuit in order to keep the variations in transmitter efficiency, on a percentage basis, at allow level; such variations may tend to result from the varying shunting action of element 24.

In addition to the shunt equalizing circuit just referred to, a variable line balancing network is provided which comprises current-sensitive resistance element 41 and capacitor 42; element 41 may comprise a symmetrical varistor similar to element 24. Resistor 43 connected in parallel with transmitter 17 and winding 23 acts to effectively modify any possible degree of nonlinearity of element 41. Capacitor 44 which is provided primarily to isolate receiver 18 from direct current effects also serves to isolate resistor 43 from direct current whereby to avoid undue direct current power loss.

The line balancing network just described serves to maintain line balance irrespective of varying loop impedance and in effect reflects some function of the loop impedance. As the loop resistance increases, the resistance of element 41 decreases and a proper resistance balance is maintained. On the longer loops the reactive component is capacitive and since, under this condition, element 21 will then be a high impedance, capacitor 42 is included in the balancing network whereby to reflect this capacitance and maintain balance on the longer loops.

It is immediately apparent that the basic station circuit arrangement includes several different expedients for maintaining an exact balance between the sides of the line and also between the different components of the circuit.

Switchhook contacts SWH–1 and SWH–2, included in the tip and ring respectively, are normally open while switchhook contact SWH–3, connected across receiver 18, is normally closed. However, when the station goes off hook, contacts SWH–1 and SWH–2 close and cut through the line after which contact SWH–3 opens and removes the shunt from receiver 18. When the station goes back on hook contact SWH–3 first closes and shunts receiver 18 following which the line contacts SWH–1 and SWH–2 open.

Normally closed dial pulsing contact 47 opens and closes during operation of the dial for transmitting the dial pulses while the dial off-normal contact 48 closes during dialing and shunts receiver 18 during that time.

Symmetrical varistor element 51 is connected across receiver 18 for click reduction purposes as well as to provide receiver equalization.

Figure 2:
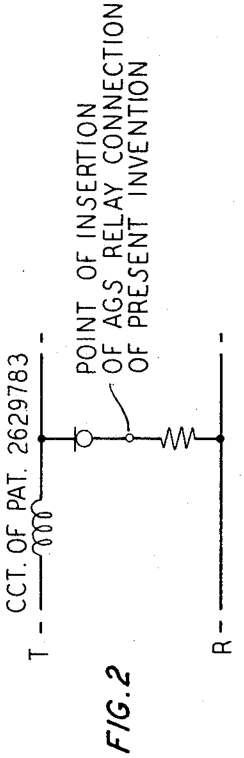
FIG. 2 shows a portion of a prior station circuit whereby to illustrate the specific point of connection of the station relay contemplated by the present invention.

In accordance with our invention, AGS (Automatic Ground Start) relay 52 is provided at the station and, as shown, is connected between one side of transmitter 17 and one side of resistor 28. Referring for the moment to FIG. 2 which shows a portion of a typical station circuit, such for example as the station circuit of the H. F. Hopkins Patent 2,629,783, it is readily apparent that the point of connection of relay 52 coincides with the electrical midpoint between the tip and ring of the line. The advantages of this novel arrangement will be discussed subsequently.

It will be assumed now for purposes of further description that there has been a power failure affecting the PBX and that PF relay 12 has accordingly released. As pointed out above the normal PBX circuits 13 and the trunk 14, which ordinarily is the source of the start ground, are now excluded from the PBX station connection.

Now, when the station goes off-hook for initiation of an emergency call, the start ground will be supplied through resistor 53, break contact of transfer pair AGS–1, lead 57, resistor 28 to the ring conductor of the line, through closed switchhook contact SWH–2, break contacts of transfer pair PF–2 and PF–4, to the central office for operation of line relay 58. Ground is now connected to the tip conductor of the line through make contact L–1 of line relay 58 and applied through break contacts of transfer pairs PF–3 and PF–1, closed switchhook contact SWH–1, closed dial pulsing contact 47, winding 21 of inductance coil, through transmitter 17 to lead 71 and through the upper (low-resistance) winding of relay 52 to lead 57, resistor 28, and back to the central office battery over the ring side of the line, AGS relay 52 operates over the path just described, that is the relay operates through its low-resistance winding.

With relay 52 operated the upper, low-resistance winding of the relay is shunted by a path through the make contact of transfer pair AGS–1 and leads 71 and 57 but the relay is held operated by ground through the lower (high-resistance) winding, lead 71, make contact of transfer pair AGS–1, lead 57 and resistor 28 to the ring and to the central office battery.

It will be noted that with relay 52 operated the talking path is completed from the tip through transmitter 17 and directly to the ring via lead 71, make contact of transfer pair AGS–1, and lead 57; that is there is no series connection of either winding of the relay in the talk path. While the high resistance winding of the relay is connected in shunt to the talk path, no degradation of the talk path results from such high resistance shunt connection.

AGS relay 52 remains operated for the duration of the call. When the call has been completed and the station returns on-hook the loop is opened at switchhook contacts SWH–1 and SWH–2 and the central office equipment and the AGS relay 52 release.

The circuit operates in a generally similar manner on incoming calls. When the station goes off-hook to answer the incoming call, relay 52 operates through its low-resistance winding from central office battery on the ring and ground on tip. After operation of the relay, the resistance ground is removed, the low-resistance winding is shunted and the relay is held operated through the high resistance winding. Relay 52 remains operated for the duration of the call. Upon completion of the call and station restored to on-hook the relay releases; release of central office equipment is under control of the calling station.

Under normal power conditions at the PBX, that is when PF relay 12 is in operated position, resistance ground will, of course, be connected to lead 73 when the station is off-hook. However, this ground is ineffective with regard to the PBX circuits 13 and has no effect during normal power conditions.

It will be apparent that the provision of the ACS relay results in automatic transmission of the start ground when the emergency connection prevails and when the customer goes off-hook. No action is required on the part of the customer other than the simple act of going off-hook; this is a major and effective advance over the prior arrangements which required the customer to operate a ground key and to hold the key closed until dial tone was returned from the central office. As pointed out above, it has been found in actual commercial use that the customer often forgets to close the key particularly when subjected to the conditions of stress which invariably accompany an emergency situation such as a power failure.

The novel method of connection followed whereby the AGS relay is connected at the electrical midpoint between the tip and ring of the line is particularly valuable since the relay so connected is not sensitive to potential reversals occurring on the line. As is well known it is the usual practice in the use of circuits of this general nature to reverse at times the battery-on-ring, ground-on-tip condition whereby to control certain supervisory indications such for example as, "Answer" supervision. Obviously, it would be undesirable to have the condition of the AGS relay affected by such surrent reversals. Since the potential value at the electrical midpoint between the tip and ring of the line will remain unchanged whether battery is found on the ring and ground on the tip or if the reverse is true, it follows that relay AGS, due to the novel method of connection, will be immune to potential reversals on the line. Further, it has been found by actual tests that there is substantially less tendency to line unbalance when the relay is connected at the electrical midpoint of the line than would result from a simple shunt connection across the line. Additionally, there is substantially less degradation of the talking path by the novel connection described than would result if the relay were simply connected across the line in shunt to the transmitter. As described above the novel arrangement is such that, after operation of the AGS relay, the talk path is free of any "additional elements" except the high resistance shunt path to ground which, in itself, results in no substantial degradation of the talk path.

While the AGS relay has been shown as a single relay having a low-resistance operate winding and a high-resistance hold winding, it will be understood that two separate single-winding relays may be used in the same general circuit arrangement if desired.

It is to be understood that the above-described arrangements are illustrative of the application of the principles of the invention. Numerous other arrangements may be devised by those skilled in the art without departing from the spirit and scope of the invention.

What is claimed is:

1. In a telephone system, a private branch exchange, a line for connecting said private branch exchange to a central office, said line including a tip conductor and a ring conductor, a customer's station, means effective under a first condition for connecting said station to the control office through circuits of said private branch exchange and effective under a second condition for connecting said station directly over said line to the central office exclusive of said circuits of said private branch exchange, said line normally being subject to supervisory tip and ring potential reversals, a ground source at said station, and means also at said station for controlling the connection of ground from said source to said line for transmission to the central office, said last-mentioned means including a relay and means for connecting said relay to a point in said line which is unaffected by said potential reversals.

2. In a telephone system, the combination defined by claim 1 further characterized in that said point of connection coincides with the approximate electrical midpoint between the tip and ring of said line at said customer's station.

3. In a telephone system, a private branch exchange, a line for connecting said private branch exchange to a central office, said line including a tip conductor and a ring conductor, a customer's station, means effective under a first condition for connecting said station to the central office through circuits of said private branch exchange and effective under a second condition for connecting said station directly over said line to the central office exclusive of said circuits of said private branch exchange, said line normally being subject to supervisory tip and ring potential reversals, a ground source at said station, a relay, means for connecting said relay to a point between the tip and ring of the line at said station, said relay having a first winding of relatively low resistance and a second winding of relatively high resistance, a resistor, means effective under said second condition and when said station is off-hook and said relay is in released position for connecting ground from said source in series with said resistor to the ring of said line, means activated by connection of said ground to the ring for connecting ground to the tip of the line and through said first winding of relatively low resistance whereby to operate said relay, and means effective upon operation of said relay for connecting ground from said source through said second winding of relatively high resistance, and exclusive of said resistor, to the ring, current flow in the path through said second winding being effective to hold said relay in operated position.

4. In a telephone system the combination defined by claim 3 further characterized in that the point of connection of said relay coincides with the approximate electrical midpoint between the tip and ring of said line at said customer's station.

5. In a telephone system the combination defined by claim 4 further characterized in that said means activated by connection of said ground to the ring for connecting ground to the tip comprises a second relay connected to the line and in that the current flow in the path through said second winding is effective also to hold said second relay in operated position.

6. In a telephone system the combination defined by claim 4 further characterized in a transmitter and a second resistor connected to said line at said customer's station, the point of connection of said relay being between one side of said transmitter and one side of said second resistor whereby said transmitter is included as a series element in a path between said tip and ring which includes also as a series element one of said windings of said relay, and means effective upon operation of said relay for excluding from said path said one winding of said relay.

7. In a telephone system, a private branch exchange, a line for connecting said private branch exchange to a central office, said line including a tip conductor and a ring conductor, a customer's station, means effective under a first condition for connecting said station to the central office through circuits of said private branch exchange and effective under a second condition for connecting said station directly over said line to the central office exclusive of said circuits of said private branch exchange, a first source of start ground, means effective under said first condition when said station goes off-hook for connecting ground from said first source to said line through said circuits of said private branch exchange, a second source of start ground and a resistor at said station, and means effective under said second condition and activated solely by said station going off-hook for connecting ground from said second source through said resistor to said line exclusive of said circuits of said private branch exchange.

8. In a telephone system, the combination defined by claim 7 further characterized in a relay at said station, means following connection of the ground from said second source through the resistor to the line for operating said relay, and means effective upon operation of said relay for connecting ground from said second source directly to said line exclusive of said resistor.

9. In a telephone system, a private branch exchange, a line for connecting said private branch exchange to a central office, a customer's station, a transmitter at said customer's station, a source of ground also at said customer's station, means for controlling the connection of ground from said source to said line, said means including a relay at said customer's station having a first winding of relatively low resistance and a second winding of relatively high resistance, means for closing an operate path for said relay including as series elements said transmitter and said first winding of relatively low resistance, and means effective upon operation of said relay for closing a holding path for said relay, said holding path including said second winding of relatively high resistance but excluding as series elements said first winding and said transmitter.

10. An automatic ground start circuit for a private branch exchange subscriber station including a transmitter connected across the tip and ring conductors, said ground start circuit including a relay means having a relatively low resistance winding and a relatively high resistance winding, first circuit means connecting said low resistance winding in series with said transmitter across said tip and ring for operating said relay means, second circuit means including contacts of said relay means for connecting said transmitter across said tip and ring exclusive of either of said windings, and third circuit means including a source of ground potential and said contacts for holding said relay means operated through said relatively high resistance winding.

No references cited.

KATHLEEN H. CLAFFY, Primary Examiner

R. P. MYERS, Assistant Examiner

U.S. Cl. X.R.

179—27